United States Patent [19]

Tanioka et al.

[11] Patent Number: 4,684,998
[45] Date of Patent: Aug. 4, 1987

[54] IMAGE READER SUITABLE FOR MANUAL SCANNING

[75] Inventors: Hiroshi Tanioka, Tokyo; Noriyoshi Ueda, Yokohama, both of Japan

[73] Assignee: Canon Kabushiki Kaisha, Tokyo, Japan

[21] Appl. No.: 618,251

[22] Filed: Jun. 7, 1984

[30] Foreign Application Priority Data

Jun. 15, 1983 [JP] Japan ................................ 58-108072
Jun. 15, 1983 [JP] Japan ................................ 58-108073
Jun. 15, 1983 [JP] Japan ................................ 58-108074

[51] Int. Cl.⁴ ...................... H04N 1/10; H04N 1/40; H04N 1/04; H04N 1/00
[52] U.S. Cl. ................................... 358/293; 358/285; 358/294; 358/256; 358/288; 250/566
[58] Field of Search .............. 358/285, 293, 294, 288, 358/264, 256; 355/21; 382/59; 235/472; 250/566

[56] References Cited
U.S. PATENT DOCUMENTS 3,346,692 10/1967 Garfield et al. ................... 358/256
3,541,248 11/1970 Young ................................ 358/294
4,268,870 5/1981 Kitamura et al. ................... 358/293
4,275,423 6/1981 Takahashi et al. .................. 358/293
4,319,283 3/1982 Ozawa et al. ...................... 358/293
4,486,786 12/1984 Sato et al. ........................ 358/294
4,523,235 6/1985 Rajchman ........................... 358/256
4,553,035 11/1985 Malinsky et al. ................... 250/566

Primary Examiner—Howard W. Britton
Assistant Examiner—John K. Peng
Attorney, Agent, or Firm—Fitzpatrick, Cella, Harper & Scinto

[57] ABSTRACT

An image reader of hand scanner type has a transparent support for fixing an original on a table in position, a reading head, LEDs for irradiating the original, an imaging sensor array for reading the original image further LEDs and sensor for detecting the head scanning position, a control circuit including a turn on circuit and/or an alarm control circuit, and a display LED. The LEDs for image reading are turned on only during image reading. When manual scanning is performed too fast and further signal processing cannot be performed, this can be signalled to the operator by the display LED.

20 Claims, 11 Drawing Figures

IMAGE READER SUITABLE FOR MANUAL SCANNING

BACKGROUND OF THE INVENTION

1. Field of the Invention

The present invention relates to a digital image input device for a copying machine, a facsimile, or an electronic file and, more particularly, to a compact, manual image reader.

2. Description of the Prior Art

Digital image reading (detecting) devices have been proposed such as a device which uses a reducing optical system and a CCD, or a contact-type line sensor comprising an optical sensor array which is brought into contact with an original for reading an image thereon. When a contact-type line sensor is used, the space conventionally required for the optical system can be reduced, so that the overall reading device can be rendered light in weight and compact in size.

Although a manual reader using such a contact-type line sensor is plausible, manual scanning results in an irregular scanning speed, making correct scanning difficult, and a circuit configuration for synchronizing line scanning is complex.

Turn on control of a light source for image reading is cumbersome while constant powering of the light source results in a high power consumption.

When high-speed scanning is performed with a manual image reader, processing of read image signals cannot follow high-speed scanning, resulting in a disturbed image.

When a reading sensor is moved on an original for image reading, the original position is deviated, and the image signal may become skipped or overlapped.

SUMMARY OF THE INVENTION

The present invention has been made in consideration of this and has its object to provide an image reader which has a simple configuration and which is capable of excellent image reading.

It is another object of the present invention to provide an image reader of hand scanner type which utilizes a contact-type line sensor to allow manual scanning of an original for reading an image thereon.

It is still another object of the present invention to provide an image reader which can perform turn on control (power supply control) of a light source for image reading with good efficiency and good operability.

It is still another object of the present invention to provide an image reader which prevents unnecessary power consumption of a light source for image reading.

It is still another object of the present invention to provide an image reader which can perform reliable image reading by manual scanning.

The above and other objects and features of the present invention will become apparent from the following description taken in conjunction with the accompanying drawings.

DETAILED DESCRIPTION OF THE PREFERRED EMBODIMENTS

Figure 1:
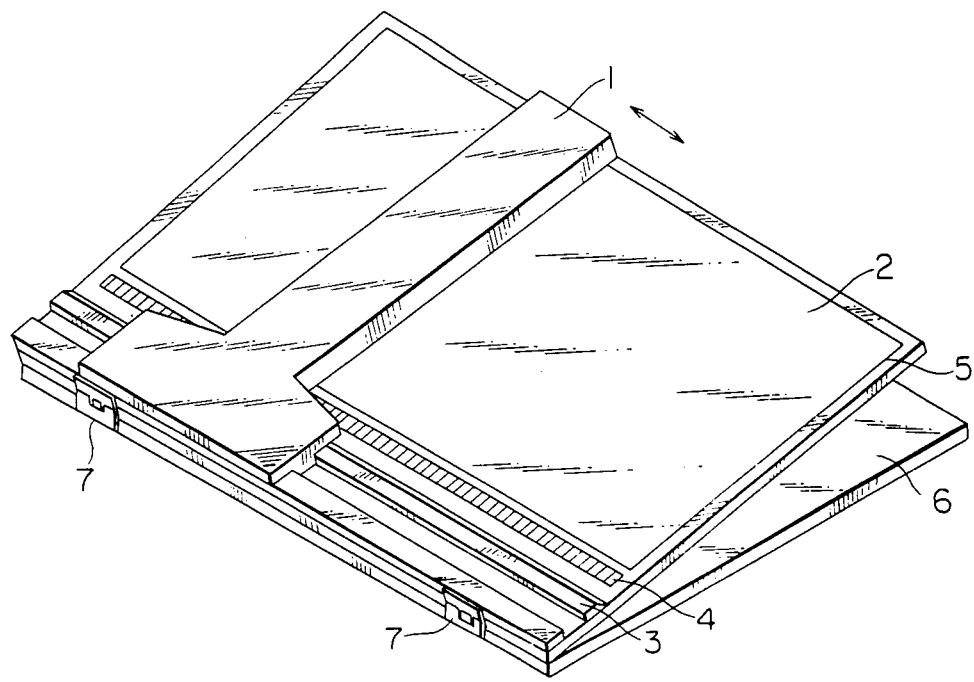
FIG. 1 is a schematic representation of an image reader according to a first embodiment of the present invention.

FIG. 1 is a schematic view of an image reader according to a first embodiment of the present invention. Although the following description is made with reference to a contact-type line sensor, not all of the embodiments of the present invention are confined to a contact-type line sensor.

A reading head 1 having a contact-type line sensor is coupled on a support member, comprising a transparent member 2 such as a glass member, with a slide mechanism 3 so as to reciprocate thereon in the direction indicated by an arrow. The integral unit of the support and the head 1 can be opened or closed with respect to an original table 6 through hinges 7. An original 20 from which an image is to be read is placed between the original table 6 and the transparent member 2 of the support with the image facing upward. The original 20 is read in a range of an image region 5 by manually scanning one line after another along the longitudinal direction of the head 1.

Figure 2:
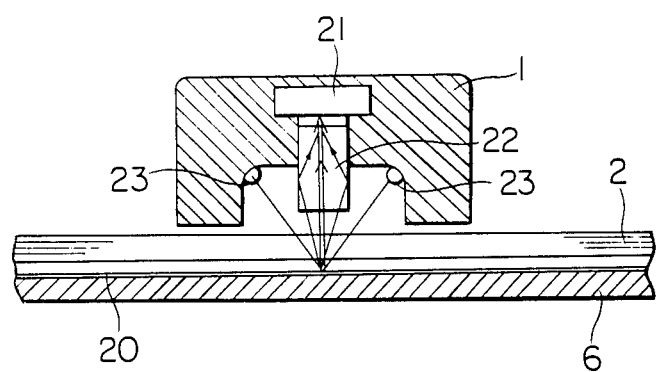
FIG. 2 is a cross-sectional view of a reading head of the reader shown in FIG. 1.

FIG. 2 shows a cross-section of the head 1 along the alternate long and short dashed line in FIG. 1. Light from two arrays each consisting of a plurality of LEDs 23 is passed through the glass member 2 and exposes the original 20. Light reflected by the original 20 is passed through the transparent member 2 of the support again and becomes incident on a light-receiving surface of a sensor 21 comprising amorphous silicon or the like through a short-focal length imaging element array (to be referred to as imaging array hereinafter) 22. The sensor 21 produces a signal corresponding to the incident light.

Figure 3:
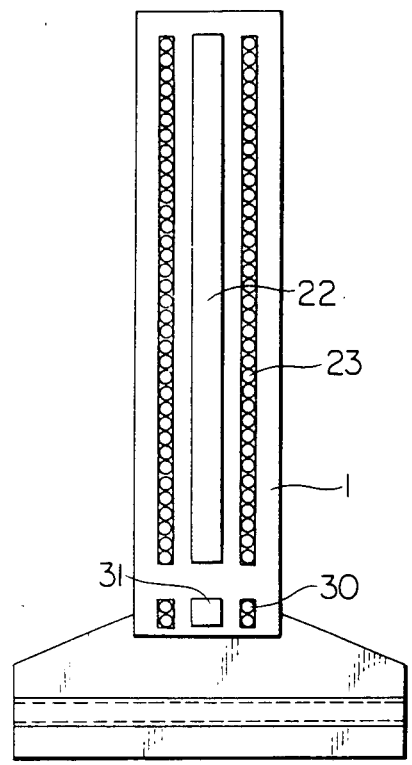
FIG. 3 is a view showing a detection surface of the reading head shown in FIG. 2.

FIG. 3 shows a detection surface (light-receiving surface) of the reading head 1. The head 1 has further LEDs 30 for detecting the scanning position in addition to the arrays of LEDs 23 for image reading. The LEDs 30 for detecting the scanning position and an imaging array 31 for imaging the light reflected from the LEDs 30 are formed integrally with the imaging reading LEDs 23 so as to oppose slits 4 of a slit width of about 30 μm printed outside the image region 5 and having a duty ratio of 50%. In this embodiment, the head has a length of 320 mm, a light-receiving element pitch of 62.5 μ (16 pels) and a resolution of 5,120 pels/line. Therefore, in order to perform good image reproduction, position detection of the head 1 at a pitch of roughly 62.5 μ must be performed. Thus, in order to detect the slits 4 having a slit width of about 30 μm and a duty ratio of 50%, the light-receiving surface of the position detecting imaging array 31 has a size of 40×500 m. Then, even if the scanning speed changes, every time the position detecting imaging array 31 detects a slit, transfer of pixel of data of 5,120 pixels of one line and accumulation of a photocurrent can be performed, so that data storage can be performed reliably. Since the position of the reading head 1 is detected optically, the imaging array and light source for position detection can be manufactured in the same process as the image sensor. This is an advantage from the industrial viewpoint.

Figure 4:
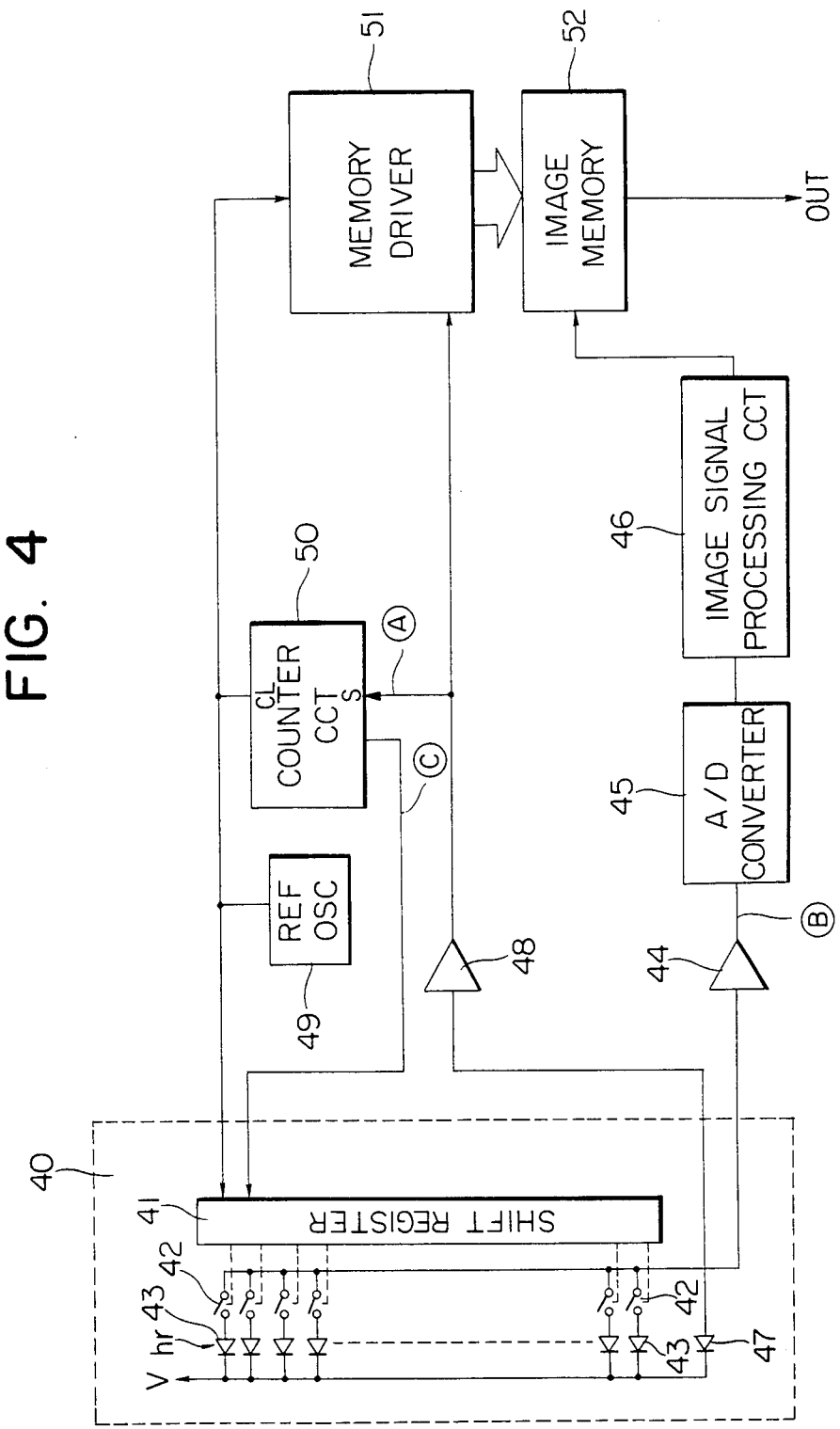
FIG. 4 is a block diagram of a control section of the reader shown in FIG. 1.

FIG. 4 is a block diagram showing the circuit configuration of a control section for image reading.

Referring to FIG. 4, a sensor 40 surrounded by the broken line comprises 5,120 photodiodes 43 each corresponding to one pixel. Detection currents from the photodiodes 43 are serially obtained by sequentially connecting 5,120 switches (SW) 42 connected the respective photodiodes 43 by shift outputs from a shift register 41 driven in synchronism with clock pulses from a reference oscillator 49. The detection currents thus obtained are amplified by an amplifier 44 to a level of signal Ⓑ as an analog image signal.

The operation start timing of the shift register 41 is determined by a detection signal Ⓐ indicating the direction of slit ends. The signal Ⓐ is obtained by amplifying and shaping by a gate 48 the output from a scanning position sensor 47 which receives light reflected from the slits 4 through the imaging array 31.

Figure 5:
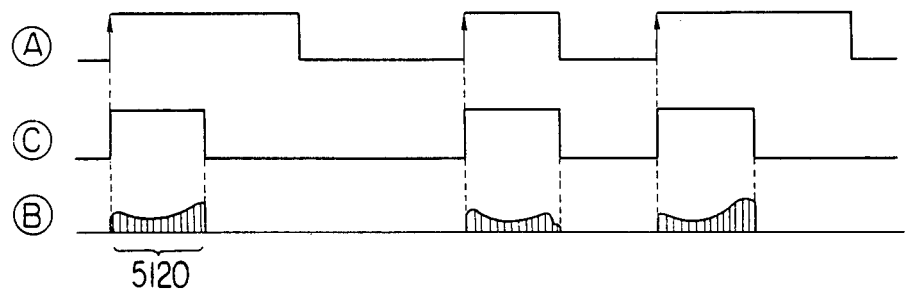
FIG. 5 shows the signal waveforms at respective points in the circuit shown in FIG. 4.

FIG. 5 shows the signal waveforms at points Ⓐ and Ⓑ.

When the reading head 1 is manually operated, the scanning speed generally becomes irregular. Thus, the signal Ⓐ as a detection signal of the slits 4 which are equally spaced apart from each other is generated having irregular durations, as shown in FIG. 5. A counter 50 is started at the leading edge of the signal Ⓐ. Then, the counter 50 starts counting the clock pulses received from the reference oscillator 49 from the leading edge of the detection signal Ⓐ, and supplies to the shift register 41 a control signal Ⓒ of high level for a time interval required for scanning one line. While the control signal Ⓒ is kept at high level, the SWs 42 are sequentially connected in synchronism with the clock pulses from the reference oscillator 49, thereby serially producing the 1-line image data as shown by Ⓑ.

Referring to FIG. 4, the image analog signal Ⓑ is converted to a digital signal of a predetermined number of bits by an A/D converter 45. The signal from the A/D converter 45 is binarized or digitized by a predetermined image signal processing circuit 46. The digital signal from the processing circuit 46 is supplied as video data to an image memory 52 having a capacity of one page.

A memory driver 51 sequentially addresses the image memory 52 in accordance with main scanning clocks, pulse outputs from the reference oscillator 49 as subscanning clocks, and the detection signal Ⓐ of the slit ends.

In this manner, a sensor is arranged at an end of a contact-type line sensor to read slit marks opposing it and so provide subscanning signals for image reading. Therefore, the sliding mechanism of the reading head can be simplified.

The scanning position can therefore be detected with high precision, and image reading can be performed at correct timings.

The manually moved reading head 1 reads through the transparent member 2 of the support the image of the original fixed by the support between its transparent member 2 and table 6. As a result, the original is kept flat, and an image is obtained without blurring. Since the original is supported by the support, it is not shifted upon manual movement of the reading head 1.

A second embodiment of an image reader according to the present invention will now be described.

In a reader of this type, it is generally necessary to turn on a main power supply before starting the scanning operation, so as to operate a switch and the like for turning on the light source. However, as has been described above, since a reading head 1 is manually scanned, other operations are preferably simplified to achieve good operability. Furthermore, if LEDs 23 as a light source for image reading are kept on when image reading is not actually performed, power is consumed needlessly. In order to prevent this LEDs 30 as the light source for scanning position detection are kept on in synchronism with the main power source, while the LEDs 23 as the light source for image reading are turned on after detecting the start of a scanning operation.

Figure 6:
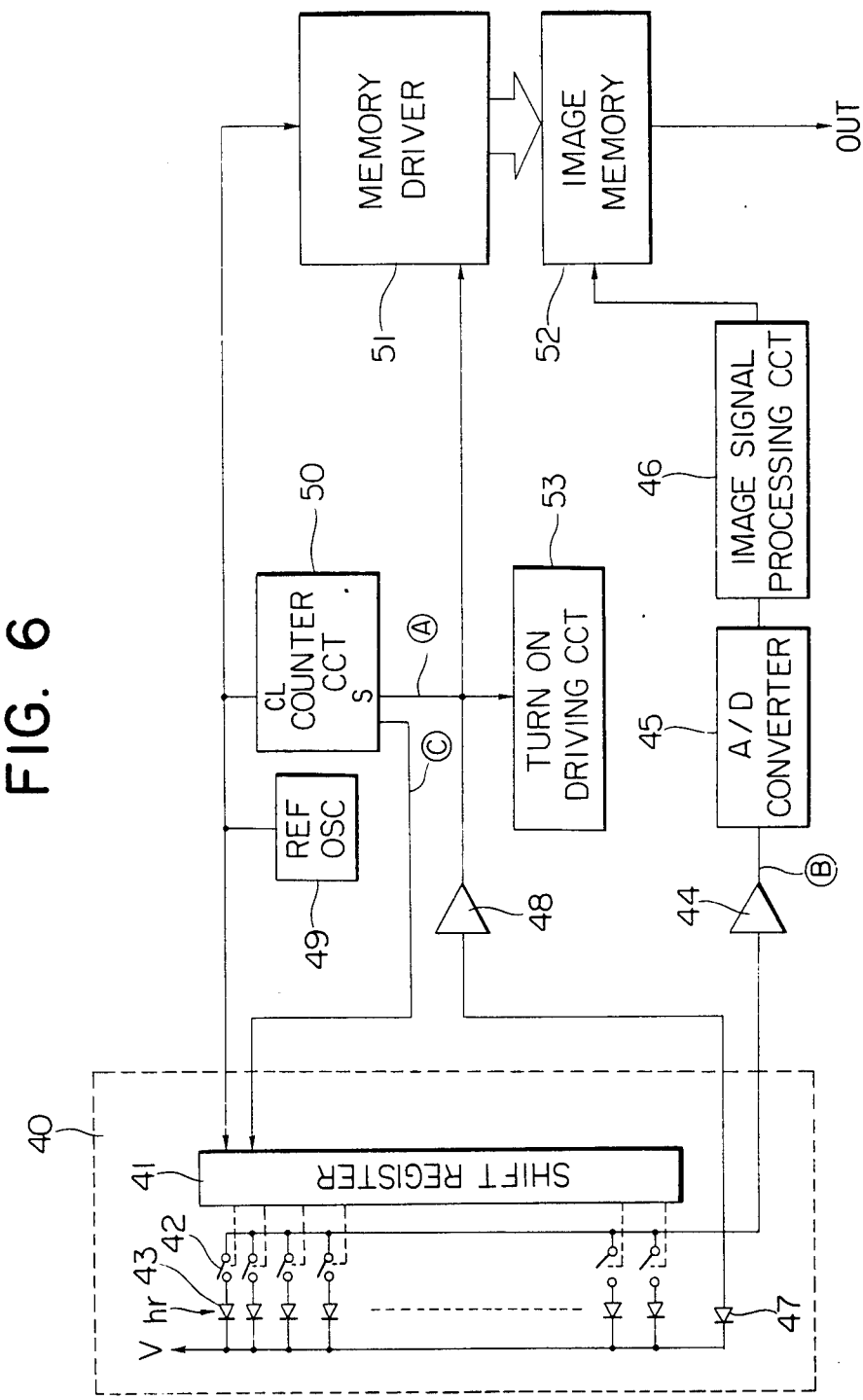
FIG. 6 is a block diagram of a control section according to a second embodiment of the present invention.
Figure 7:
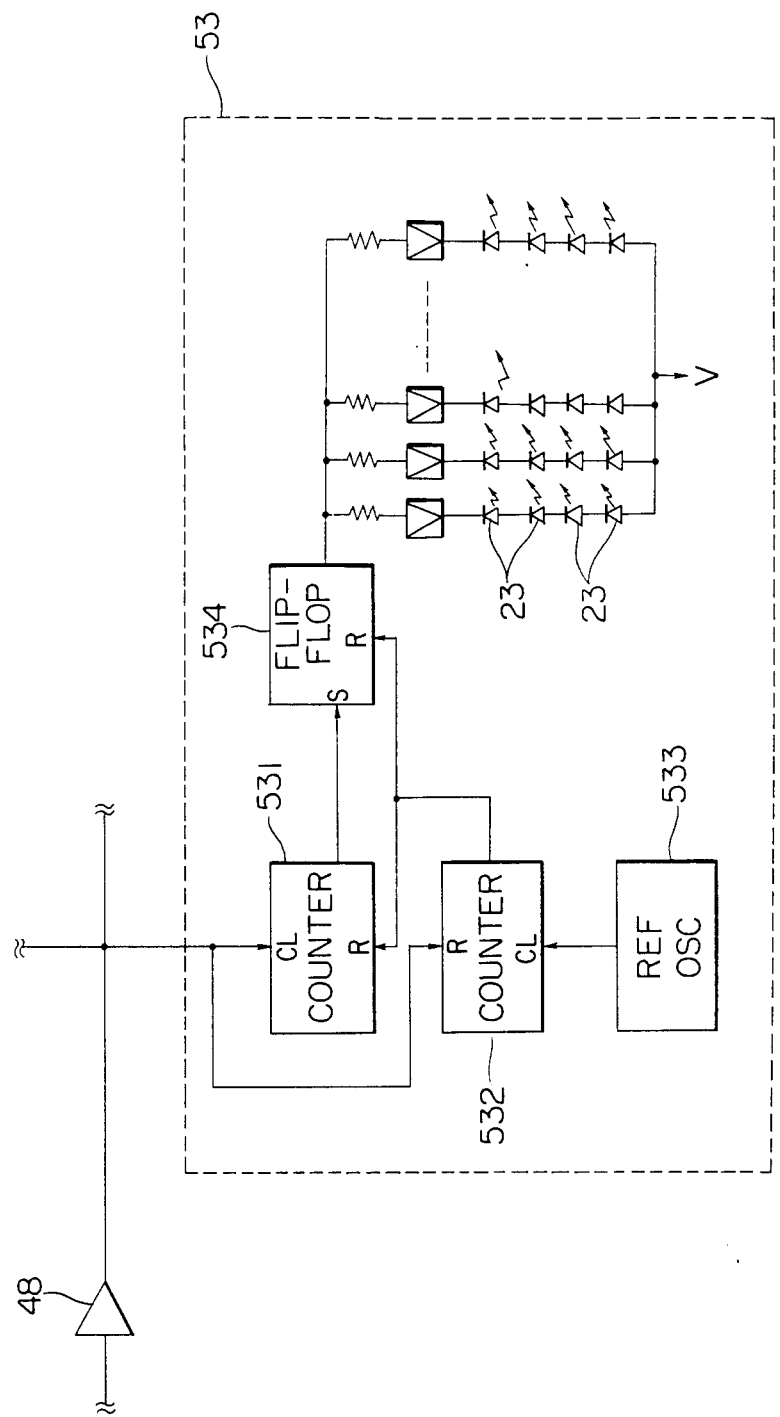
FIG. 7 is a block diagram of a turn on circuit of a light source.

FIG. 6 is a block diagram of a control section according to this second embodiment of the present invention. FIG. 7 shows the internal configuration of a turn on circuit 53 for turning on the LEDs 23 for image reading. Other parts shown in FIG. 6 are the same as those shown in FIG. 4, and a detailed description thereof is omitted.

Referring to FIG. 7, counters 531 and 532 respectively count pulses generated by the sensor 47 upon reading the slits 4 when the head 1 is moved, and pulses of constant period generated by a reference oscillator 533. When the head 1 starts scanning the original 20 and a predetermined number of pulses are supplied to the counter 531, an output from a flip-flop 534 is set by a set signal from the counter 531. The output from the flip-flop 534 turns on the LEDs 23. The counter 532 which counts the pulses of constant period from the reference oscillator 533 (which may be the reference oscillator 49 shown in FIG. 6) is reset by a signal generated upon reading a slit mark. When the counter 532 counts a predetermined number of pulses, that is, when the counter 532 does not receive a new signal generated upon reading a slit mark within a predetermined period of time, it decides that image reading is not performed. The counter 532 then resets the flip-flop 534 to turn off the LEDs 23. Then, turning on of the LEDs 23 due to vibration or the like can be prevented. Therefore, the LEDs 23 can be turned off after scanning completed. The light source control of the second embodiment is suitable not only for a manual scanner but also for an image reader having a motor driven reading head 1.

Thus, in the reader of the present invention, the reading head 1 has a pair of a light source and a sensor for detecting the scanning position. The light source for detecting the scanning position is constantly kept on when the control power source is turned on so as to allow monitoring of a start of the scanning operation. When the start of the scanning operation is detected, the light source for image reading is turned on. Thus, a significant improvement in operability is obtained. It is to be noted that the light source is not limited to LEDs.

As has been described above, the image exposure light source is turned off during an interval other than image reading. For this reason, unnecessary power consumption is prevented, and the life of the light source is prolonged.

A third embodiment of an image reader according to the present invention will be described below.

When manual scanning using the reading head 1 as described above is performed at high speed and when the reading head 1 reaches the reading position for the next line before the image data of the current line is completely transferred, the data stotage cannot be performed and the image is disturbed. In such a case, the reader of the third embodiment signals to the operator that no further image reading can be performed.

Figure 8:
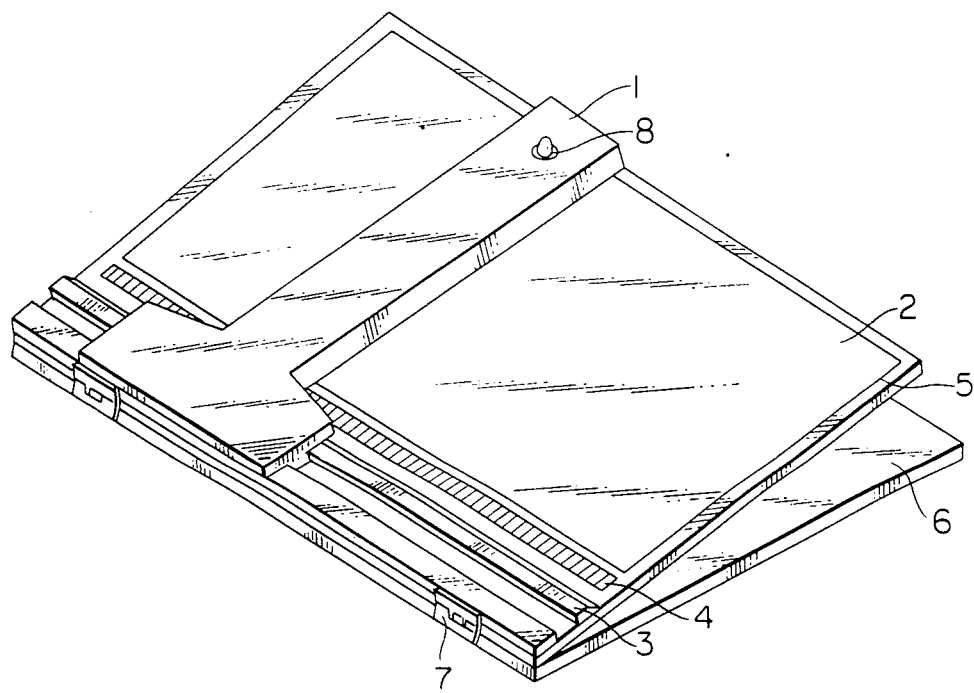
FIG. 8 is a schematic view of an image reader according to a third embodiment of the present invention.

FIG. 8 shows a schematic view of an image reader for performing such signalling of the image reading disable state to the operator.

A reading head 1 with a contact-type line sensor is coupled to a support, comprising a transparent member 2 of glass or the like, with a sliding mechanism 3 so as to reciprocate thereon. The reading head 1 together with the transparent member 2 can be opened or closed with respect to an original table 6 through hinges 7. An original to be read is placed between the transparent member 2 and the original table 6 with the image facing upward. The image or the original is read in an image region 5 by manual scanning in units of lines along the longitudinal direction of the head 1. An alarm LED 8 is mounted on the reading head 1 so as to signal the image reading disable state to the operator. The structure and function of the reader shown in FIG. 8 are substantially the same as those of FIG. 1, except that the alarm LED 8 is used.

Figure 9:
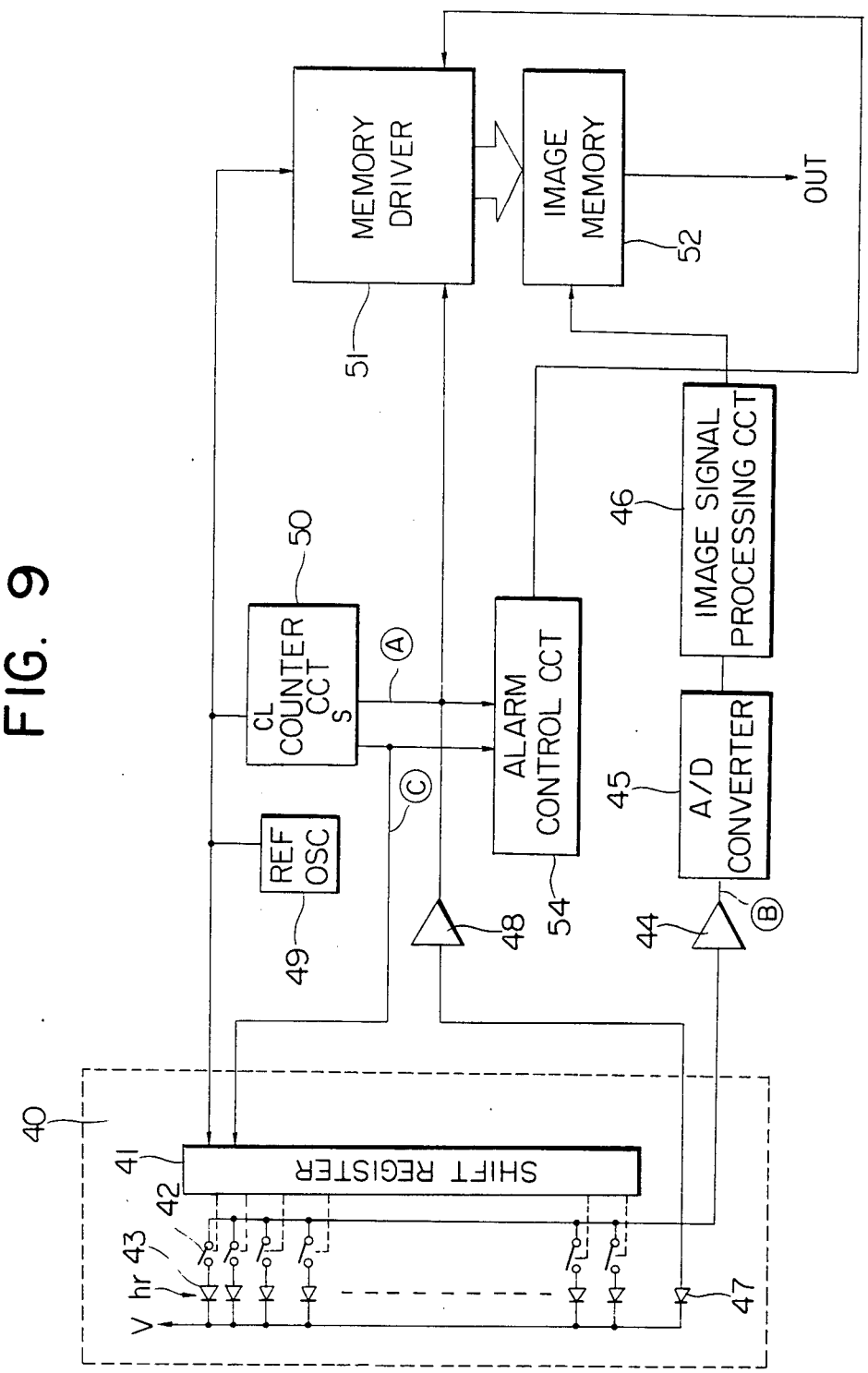
FIG. 9 is a block diagram of a control section of the third embodiment.

FIG. 9 shows the circuit configuration of a control section according to the third embodiment of the present invention.

Referring to FIG. 9, an alarm control circuit 54 detects the scanning speed of the reading head 1. When the transfer of one-line image data cannot be performed, the alarm control circuit 54 is turned on to signal the image reading disable state to the operator. The remaining portion of the control section shown in FIG. 9 is the same as that shown in FIG. 4, and a detailed description thereof will therefore be omitted.

Figure 10:
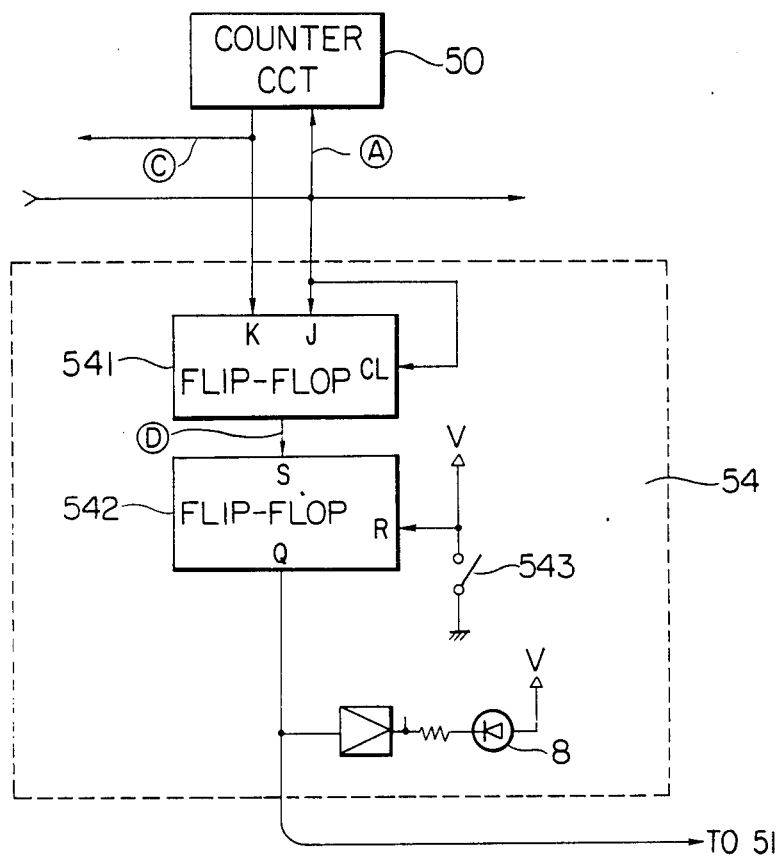
FIG. 10 is a block diagram showing an alarm control circuit.
Figure 11:
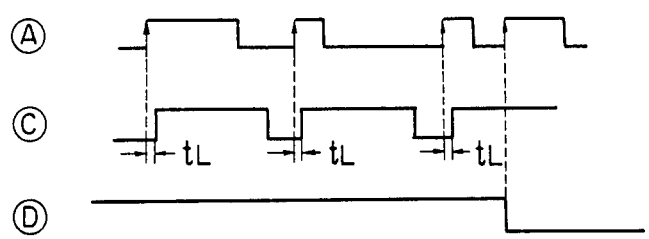
FIG. 11 is a timing chart showing the signal waveforms in the third embodiment.

FIG. 10 is a block diagram showing the details of the alarm control circuit 54 shown in FIG. 9. The alarm operation will be described in detail with reference to the block diagram shown in FIG. 10 and the timing chart shown in FIG. 11.

A J input terminal and a clock terminal CL of a J-K flip-flop (F/F) 541 receive a signal representing the transfer timing of the image data based on input of the scanning position detection signal, that is, a detection signal Ⓐ of a slit mark. A K input terminal of the F/F 541 receives a transfer signal Ⓒ supplied from a counter 50. The signal Ⓒ is delayed from the signal Ⓐ by time tL by a gate circuit. As can be seen from the leading edge of the signal Ⓐ corresponding to the fourth slit mark, when high-speed scanning is performed, data transfer of the previous line (third line) is not completed. For this reason, the signal Ⓒ to the K input terminal of the F/F 541 is kept at "H" level. Therefore, output Ⓓ from the F/F 541 is inverted. An R-S flip-flop (F/F) 542 latches the inverted signal Ⓓ so as to turn on the alarm LED 8. The turn on signal from the F/F 542 is also supplied to a memory driver 51 so as to stop the counting operation of an address counter which generates addresses for accessing image memory 52 storing video data. Thus, image signal writing in the image memory 52 is inhibited. The ON state (alarm state) of the alarm LED 8 can be released by resetting the F/F 542 by a switch (SW) 543.

As has been described above, in an image reader which transfers image data obtained by manual scanning in units of one-line image data, the scanning time and transfer time are compared with each other. If scanning of the next line before completion of image data transfer for the current line is detected, the alarm LED 8 on the head 1 is turned on to signal to the operator that no further scanning can be performed. Thus, reliable image reading and image data storage can be performed.

In this manner, since the image reading state is signalled to the operator, reliable image reading can be performed.

In this embodiment, if the scanning speed of manual scanning is too fast, this is signalled to the operator. However, too slow a scanning speed or an optical scanning speed may be displayed instead.

The video data stored in the image memory 52 is transferred to a printer for image recording or is supplied to a monitor CRT or the like to be displayed thereon. The video data can also be stored again in an electronic file such as an optical disk or is transmitted to a remote location through a telephone circuit.

Although the present invention is described herein with reference to three separate embodiments, the present invention may be applied to a combination of one or more of such embodiments.

Futhermore, although the present invention is described with reference to the particular embodiments, the present invention is not limited to them. Accordingly, various other changes or modifications may be made within the spirit and scope of the present invention as defined in the appended claims.

What we claim is:

1. An image reader comprising:
   first light-receiving means for performing an image reading operation upon being moved manually;
   second light-receiving means movable together with said first light-receiving means for detecting a reading position of said first light-receiving means by reading an optical pattern;
   light source means movable together with said first light-receiving means for irradiating an image to be read by said first light receiving means and for irradiating said optical pattern to be read by said second light-receiving means; and
   control means for controlling the image reading operation of said first light-receiving means in accordance with an output from said second light-receiving means.

2. An image reader according to claim 1, wherein said optical pattern is formed outside an image reading region which is read by said first light-receiving means.

3. An image reader according to claim 2, wherein said light source means comprises a first light source for irradiating said image and a second light source for irradiating said optical pattern.

4. An image reader according to claim 1, wherein said first light-receiving means comprises a line sensor which reads the image in units of lines.

5. An image reader according to claim 1, further comprising means for displaying an image reading disable state of said first light-receiving means in accordance with an output from said second light-receiving means.

6. An image reader according to claim 1, further comprising a light source control means performing turn on control of said light source means in accordance with an output from said second light-receiving means.

7. An image reader according to claim 1, wherein said first and second light-receiving means comprise a manually movable single integral unit.

8. An image reader comprising:
a light source for irradiating an image to be read;
reading means manually moved for reading an image irradiated by said light source; and
control means for performing turn on control of said light source in synchronism with movement of said reading means.

9. An image reader according to claim 8, wherein said control means turns on said light source when said reading means starts moving.

10. An image reader according to claim 8, further comprising means for detecting a position of said reading means, and said control means performs the turn on control of said light source in accordance with an output from said detecting means.

11. An image reader according to claim 8, wherein said reading means has a line sensor for reading the image in units of lines.

12. An image reader according to claim 8, wherein said control means turns off said light source when said reading means stops moving.

13. An image reader according to claim 8, wherein said reading means reads the image in synchronism with movement thereof.

14. An image reader according to claim 8, wherein said light source is mounted on a movable member together with said reading means.

15. An image reader comprising:
reading means manually movable for reading an image;
detecting means for detecting a moving state of said reading means; and
display means for displaying an indication of whether or not the moving state of said reading means is suitable for an image reading operation of said reading means in accordance with a detection output from said detecting means.

16. An image reader according to claim 15, wherein said display means displays an improper moving state of said reading means.

17. An image reader according to claim 16, further comprising means for discriminating that the moving state of said reading means is improper in accordance with a transfer time of an image signal from said reading means and a detection signal from said detecting means.

18. An image reader according to claim 15, wherein said reading means reads the image in synchronism with movement thereof.

19. An image reader according to claim 15, wherein said reading means has a line sensor which reads the image on a line by line basis.

20. An image reader according to claim 15, wherein said display means is provided on said reading means.

* * * * *

UNITED STATES PATENT AND TRADEMARK OFFICE
CERTIFICATE OF CORRECTION

PATENT NO. : 4,684,998
DATED : August 4, 1987
INVENTOR(S) : HIROSHI TANIOKA ET AL.

It is certified that error appears in the above-identified patent and that said Letters Patent is hereby corrected as shown below: On the title page <u>AT [57] IN THE ABSTRACT</u>

Line 4, "image" should read --image,--.

<u>COLUMN 1</u>

Line 40, "has its" should read --has as its--.

<u>COLUMN 3</u>

Line 19, "connected the" should read --connected to the--.

<u>COLUMN 5</u>

Line 9, "stotage" should read --storage--;
    Line 24, "or" should read --of--.

<u>COLUMN 6</u>

Lines 17-18, "operator. Paragraph However" should read --operator. However,--.

Signed and Sealed this

Eighth Day of December, 1987

Attest:

DONALD J. QUIGG

*Attesting Officer*    *Commissioner of Patents and Trademarks*